March 26, 1940.  R. D. NEAL  2,195,093
LID SUPPORT
Original Filed March 9, 1938
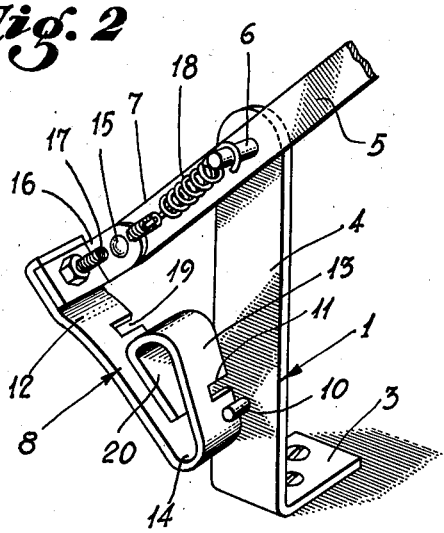
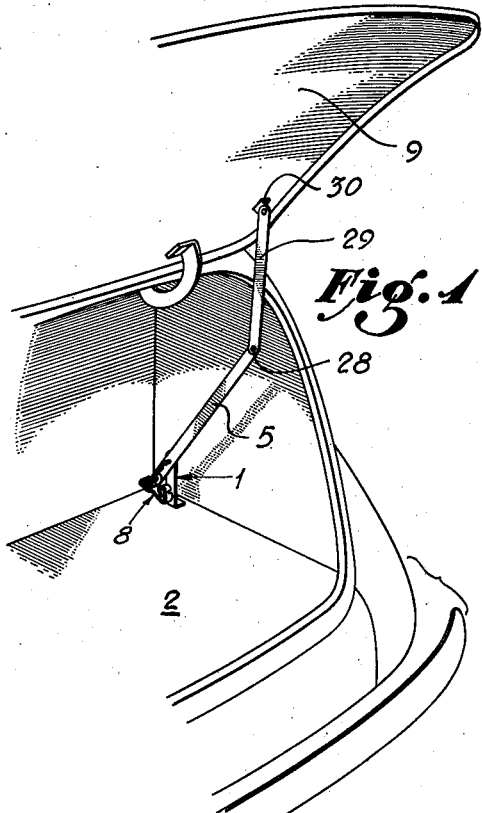
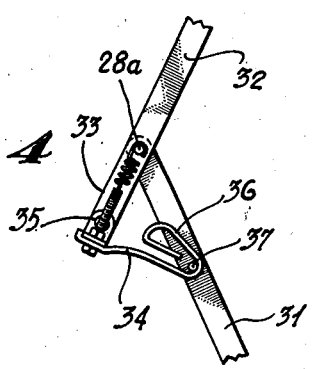
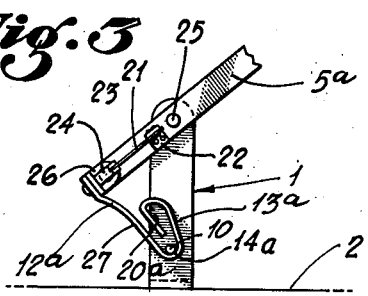
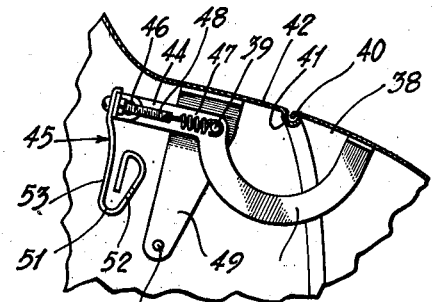
INVENTOR
RALPH D. NEAL
BY
Lyon & Lyon ATTORNEYS Patented Mar. 26, 1940

2,195,093

UNITED STATES PATENT OFFICE 2,195,093

LID SUPPORT

Ralph D. Neal, Los Angeles, Calif.

Application March 9, 1938, Serial No. 194,869
Renewed August 21, 1939

11 Claims. (Cl. 217—60)

This invention relates to a device, which is intended to be used primarily as a lid support, but which can also be used for holding a spring-closed swinging door in an open position. The device is very useful in connection with a heavy lid, such as the lids frequently used at the rear of automobiles.

The general object of the invention is to produce a device of this character, of simple construction, which will operate when the lid or door is opened to hold the same in the open position, but which will automatically release itself upon a slight further opening movement of the lid or door. In other words, the device operates automatically in the opening and closing movements of the lid.

A further object of the invention is to provide a device of this kind, which can be mounted on a fixed support either adjacent to the hinge connection of the lid, or at a point removed from the hinge connection.

A further object of the invention is to provide a device of this kind, which can be incorporated with the hinge connection for the lid, so that a pivot employed in the device will operate as the hinge support for the lid.

Further objects of the invention will appear hereinafter.

The invention consists in the novel parts and combination of parts to be described hereinafter, all of which contribute to produce an efficient lid support.

A preferred embodiment of the invention is described in the following specification, while the broad scope of the invention is pointed out in the appended claims.

In the drawing:

Fig. 1 is a perspective illustrating an adaptation of the invention to support the rear lid of an automobile body.

Fig. 2 is a perspective showing the lower portion of the device with the lifting arm broken away, and illustrating the same device that is illustrated in Fig. 1. This view is, of course, upon an enlarged scale.

Fig. 3 is a side elevation illustrating the type of the device shown in Fig. 2, but illustrating the device in its locking position for supporting a lid, and this view also illustrates a different type of spring from that illustrated in Fig. 2.

Fig. 4 is a side elevation illustrating an adaptation of the device to the pivotal connection of two supporting links for a lid, the said links being broken away. This view illustrates the device with the parts in the relation they have when it is supporting a lid.

Fig. 5 is a vertical section taken in a front and rear direction through the upper portion of an automobile rear lid, and showing the adjacent parts of the automobile body. This view illustrates a type of the device which adapts it to be employed as the hinge connection for the lid, at the same time, operating automatically to hold the lid up when it has been raised, and to permit the same to be readily closed when desired.

Before proceeding to a more detailed description of the invention, it should be stated that in practicing the invention, I provide a pair of relatively movable members, one of which is adapted to be connected to the lid, and the other to a fixed support. A pivot connection is provided between said members, and one of the members is provided with a locking device, which, for convenience I call a locking leaf because as illustrated in the present drawing, it is shown in the form of a bent strap or leaf of strap metal. The other member carries a locking pin, and the construction is such that in the lifting movement of the lid the locking pin projects into the bend of the locking leaf. The locking leaf is provided with a notch or similar means to permit the locking pin to pass into it and to engage a socket that is provided within the locking leaf, and when in this socket, the device operates to support the lid in its raised position. Upon a slight further lifting movement of the lid, the locking pin passes through another notch provided in the locking leaf, which permits the locking leaf to become disengaged from the locking pin, whereupon the lid can be closed freely.

In one type of the device I apply it to the bottom of the pivotal support for toggle links of a common type, which are frequently used for supporting lids.

In another type of the device I apply it to a toggle connection between the two toggle links; and in a third type, I apply the invention directly at the hinge connection for the lid, and in such a way that the pivotal connection that I employ in my device, operates as a hinge for the lid.

In Fig. 1, I illustrate a type of the device in which the invention is applied to the lower end of the lower link of a pair of toggle links for supporting a lid. Referring to Figs 1 and 2, in adapting the invention to this type of device, I provide a fixed bracket 1, which may be secured to the floor 2 of the car at this point. As illustrated, this attachment is made by providing a laterally bent foot 3 that is screwed down to the floor. From this foot 3 an upright or flat post 4 projects upwardly. In practice, the mechanism illustrated on the forward side of the flat post 4, could be placed on the rear side so as to reduce clearance and house the mechanism out of sight. But for the purpose of more clearly illustrating the improvement, I have illustrated it as shown in Figs. 1 and 2, with the mechanism on the forward side of the flat post 4. At an elevated point on the post 4, I provide a pivotal connection between the post and the lifting arm 5 of the construction. This is preferably accomplished by employing a stud or pivot pin 6 that projects out from the face of the post. The lifting arm 5 has a short arm or tail arm 7 that extends downwardly or rearwardly beyond the pivot pin 6, and on this tail extension I attach a locking leaf 8, and in the lifting movement of the lid 9 this locking leaf engages a locking pin 10 that projects out from the face of the post. The locking leaf is constructed so that when it engages the pin 10, it will be slightly deflected by the pin, and while in this deflected position, the pin 10 will pass through a notch 11 that I provide in the edge of the locking leaf. After the locking pin is passed through the notch, the lid can be let down slightly, and this will seat the locking pin 10 in the socket carried by, or formed in, connection with the locking leaf. In the present instance, the locking leaf 8 comprises a body portion 12 and an outer extension 13, said extensions being preferably formed integrally by bending a strip of metal so as to form a bend or bight at the point of connection of these two parts, which forms a stop in the form of a socket 14 to receive the pin 10 and hold the lid up.

The outer extension 13 is preferably disposed at an angle to the body portion 12, and in such a way that the pressure of the pin against the outer face of this part 13, will deflect the leaf away from the pin. While it is possible to practice the invention by constructing the locking leaf 8 of light spring metal having sufficient resiliency of its own, I prefer to mount the inner end of the body portion 12 on the outer end of the tail arm 7 through the medium of a pivot pin 15, and in making this pivotal mounting I prefer to employ an angle bracket 16 for this purpose, one leaf of which is applied to the side of the tail arm 7, and the other side of which is bolted to the inner end of the body portion 12. The bolt that is employed for this purpose is preferably a long bolt 17, the middle portion of which is broken away in Fig. 2 to more clearly show the pivot 15; and the upper end of this bolt is connected to a spring, for example, a coil spring 18, the upper end of which may be anchored on the pivot pin 6, if desired. In other words, I provide a construction for yieldingly holding the leaf 8 in position so that it can be deflected when it strikes the pin 10.

Fig. 3 shows the locking position of the pin in a socket 14a, corresponding to the socket 14. In order to disengage the pin 10 from the socket 14 and permit the lid to be lowered, I provide a second socket 19 in the body portion 12 of the leaf. It will be evident that if the lid is lifted from its locked position, the body portion 12 will travel along the adjacent face of the pin 10 until the notch 19 reaches the pin, whereupon the pin will pass through the notch. As this occurs, of course, there is considerable deflection of the locking leaf 8, which is permitted by the spring 18, the rotation taking place around the pivot 15.

In order to insure that the pin 10 will stay inside of the locking leaf even if the lid is lifted considerably beyond the point where it is to be supported, I prefer to provide the leaf with an inner tongue 20, which is formed by bending back the upper end of the outer extension 13 so that this tongue projects into the angle between the outer end of the body portion 12 and the outer end of the outer extension 13. In other words, this tongue projects toward the socket 14, and it therefore acts as a guide for the pin 10 when the lid is being lowered to the locking position.

In Fig. 3, I illustrate an embodiment of the invention in which I employ a leaf spring 21 instead of the coil spring 18. This leaf spring is held fixed on a suitable bracket 22 on the tail arm, and the end of this flat spring projects loosely into a notch or slot 23 formed on a short arm 24 projecting toward the pivot pin 25 on the angle bracket 26 that carries the locking leaf 27. This leaf spring 21 performs its function in the same way as the coil spring 18, that is to say, it holds the locking leaf in a predetermined relation to the tail arm, but permits it to be deflected when it strikes the pin.

The lifting arm 5 may be connected to the lid 9 in any suitable manner to enable the locking arm to be pulled up when the lid is raised. In the present instance, as illustrated in Fig. 1, the arm 5 has a pivotal connection 28 to a link 29 that is pivotally attached to the under side of the lid by a suitable bracket 30.

In Fig. 4 I illustrate an adaptation of the invention in which the improvemet is applied at a toggle connection 28a between a lower link or arm 31 and an upper link 32. These links form, of course, a toggle connection at the point 28a, and either one of these links, for example, the link 32, is provided with a tail arm 33 on which the locking leaf 34 is attached by a pivot pin 35 indicated in dotted lines. The action of this device shown in Fig. 4, is substantially the same as that shown in Fig. 2; in other words, as the angle between the links 31 and 32 opens up, the outer extension 36 of the locking leaf will engage the locking pin 37, which pin will pass through a notch corresponding to the notch 11 and into the interior of the locking leaf. Thereafter a slight downward movement of the lid will cause the pin 37 to seat in the manner indicated in Fig. 4.

Of course, the upper link 32 is pivotally attached to the lid, and the lower link 31 is pivotally attached on a support such as the floor 2.

In Fig. 5 the lid 38 is hingedly supported on a hinge pin 39, which forms a part of my device. The lid 38 may be provided with the usual downwardly bent bead 40 that is received in a shallow gutter 41 formed in the plate 42 of the car body. This gutter 41 will carry off water and keep the interior under the lid dry. The pivot pin 39 carries a bent lifting arm 43, which is offset in order to clear the gutter 41 in the open position of the lid. The end of this curved lifting arm is rigidly secured to the under side of the lid. The arm also has a tail arm 44, the outer end of which carries a locking leaf 45 secured on a pivot pin 46 and yieldingly held in position by a coil spring 47 and bolt 48 corresponding to the bolt 17. The pin 39 projects outwardly from the bracket plate or member 49 that is rigidly secured to the fixed plate 42 of the car body. This bracket extends downwardly, and carries the locking pin 59 adjacent its lower end. The locking leaf 45 is constructed as illustrated in Fig. 2, and is provided with two notches corresponding with the notches 11 and 19 to enable it to cooperate with the locking pin 50 when the lid is raised. In other words, the pin can pass into the locking leaf and seat itself in a socket 51 formed between the outer extension 52 and the body portion 53 of the locking leaf.

It should be understood that while I have illustrated this improvement as applied to a lid, it would operate with equal facility on a door, window, or cover of a cupboard, or any other hinged lid, or door, which it is necessary or desirable to lock in an open position.

It is understood that the embodiment of the invention described herein is only one of the many embodiments this invention may take, and I do not wish to be limited in the practice of the invention, nor in the claims, to the particular embodiment set forth.

What I claim is:

1. In a lid support, the combination of a pair of relatively movable members, one of which is adapted to be connected to the lid and the other to a fixed support, a pivot connecting the said members, one of said members having a locking leaf mounted thereon, and the other having a locking pin projecting across the path of the locking leaf when the lid is being raised, said leaf having an extension in the path of the locking pin to be engaged by the locking pin, and having a notch in the edge thereof through which the pin will pass in the opening movement of the lid, said locking leaf having a stop to engage the locking pin after the same has passed through the said notch, to hold the lid in its raised position, said locking leaf having another extension with a second notch operating to release the locking pin from the locking leaf upon a further opening movement of the lid.

2. In a lid support, the combination of a pair of relatively movable members, one of which is adapted to be connected to the lid and the other to a fixed support, a pivot connecting the said members, one of said members having a locking leaf pivotally mounted thereon and yieldingly held in position, and the other member having a locking pin projecting across the path of the locking leaf when the lid is being lifted, said leaf having an extension in the path of the locking pin to be engaged by the locking pin, and having a notch in the edge thereof through which the pin will pass in the opening movement of the lid, said locking leaf having a stop to engage the locking pin after the same has passed through the said notch, to hold the lid in its raised position, said locking leaf having another extension with a second notch operating to release the locking pin from the locking leaf upon a further opening movement of the lid.

3. In a lid support, the combination of a pair of relatively movable members, one of which is adapted to be connected to the lid and the other to a fixed support, a pivot connecting the said members, a locking leaf pivotally mounted on one of said members with a resilient means for holding the same in a predetermined position, the other member having a locking pin projecting across the path of the locking leaf when the said members have relative movement on the said pivot when raising the lid, said leaf having an extension in the path of the locking pin to be engaged by the locking pin, and having a notch in the edge thereof through which the pin will pass in the opening movement of the lid, said locking leaf having a stop to engage the locking pin after the same has passed through the said notch, to hold the lid in its raised position, said locking leaf having another extension with a second notch operating to release the locking pin from the locking leaf upon a further opening movement of the lid.

4. In a lid support, the combination of a pair of relatively movable members, one of which is adapted to be connected to the lid and the other to a fixed support, a pivot connecting said members, one of said members having a locking leaf consisting of a bent metal strap having a body portion pivotally mounted on that member, with resilient means for normally holding the locking leaf in a predetermined position, the other member having a locking pin projected across the path of the locking leaf when the said members have relative movement on their connecting pivot in raising the lid, said locking leaf having an outer extension forming an angle with the outer end of said body portion and lying adjacent to the locking pin when the lid is in its closed position, said outer extension having a notch cut therein to permit the locking pin to pass through the same and into a position to become engaged in the angle between the outer extension and the body portion to hold the lid open, said body portion having a notch therein operating to release the locking pin from the locking leaf by a further opening movement of the lid.

5. In a lid support, the combination of a pair of relatively movable members, one of which is adapted to be connected to the lid and the other to a fixed support, a pivot connecting said members, one of said members having a locking leaf consisting of a bent metal strap having a body portion pivotally mounted on that member, with resilient means for normally holding the locking leaf in a predetermined position, the other member having a locking pin projected across the path of the locking leaf when the said members have relative movement on their connecting pivot in raising the lid, said locking leaf having an outer extension forming an angle with the outer end of said body portion and lying adjacent to the locking pin when the lid is in its closed position, said outer extension having a notch cut therein to permit the locking pin to pass through the same and into a position to become engaged in the angle between the outer extension and the body portion to hold the lid open, said body portion having a notch therein operating to release the locking pin from the locking leaf by a further opening movement of the lid, said outer extension of said leaf having a tongue projecting into the angle between the said body portion and the said outer extension operating to engage the locking pin after it passes through the first-named notch and for guiding the same into the said angle between the body portion and the said outer extension.

6. In a lid support, the combination of a pair or relatively movable members, one of which is adapted to be connected to a lid and the other to a fixed support, a pivot connecting said members, a locking leaf having a body portion pivotally attached to one of said members with a spring for yieldingly holding the same in a predetermined position, a locking pin on the other of said members projecting across the path of the locking leaf so as to engage the same in the lifting movement of the lid, said leaf having an integral outer extension with a bend connecting the same with the body portion and forming a socket, said outer extension further having a notch in the edge thereof through which the locking pin will pass in the opening movement of the lid, and said parts cooperating after the pin has passed through the said notch, to engage the pin in the said socket when the lid is moved toward its closed position, to hold the lid in its raised position, said body extension having a notch in its edge operating to permit the locking pin to pass through the same and out of engagement with the leaf when the lid is raised thereafter.

7. In a lid support, the combination of a fixed bracket adapted to be attached to a support, a lifting arm pivotally attached to the bracket with means for connecting the same to the lid to raise the lifting arm when the lid is raised, a locking leaf pivotally attached to the lifting arm with means for normally holding the same yieldingly in position, a locking pin projecting from the fixed bracket and lying in the path of the locking leaf when the lifting arm is moved in the lifting movement of the lid, said locking leaf having an outer extension with a notch therein to permit the locking pin to pass through the notch, said locking leaf having a socket to engage the locking pin after the same has passed through the notch, to support the lifting arm in a raised position and hold up the lid, said locking leaf having a second notch operating to permit the locking pin to pass through the same and out of engagement with the locking leaf when the lid is raised thereafter.

8. In a lid support, the combination of a fixed bracket adapted to be attached to a support, a lifting arm pivotally attached to the bracket, having a tail-arm, and with means for connecting the same to the lid to raise the lifting arm when the lid is raised, a locking leaf pivotally attached to the tail-arm of the lifting arm with means for normally holding the same yieldingly in position, a locking pin projecting from the fixed bracket and lying in the path of the locking leaf when the lifting arm is moved in the lifting movement of the lid, said locking leaf having an outer extension with a notch therein to permit the locking pin to pass through the notch, said locking leaf having a socket to engage the locking pin after the same has passed through the notch, to support the lifting arm in a raised position and hold up the lid, said locking leaf having a second notch operating to permit the locking pin to pass through the same and out of engagement with the locking leaf when the lid is raised thereafter.

9. In a lid support, the combination of a fixed bracket adapted to be attached to a support, a lifting arm pivotally attached to the bracket, a link connecting the end of the arm to the lid, said lifting arm having a tail-arm beyond its pivotal connection with the bracket, a locking leaf pivotally attached on the tail-arm with means for normally holding the same in a predetermined position with respect to the tail-arm, a locking pin projecting from the fixed bracket and lying in the path of the locking leaf when the lifting arm is moved in the lifting movement of the lid, said locking leaf having a notch therein to permit the locking pin to pass into the locking leaf, said locking leaf further having a socket to engage the locking pin after the same has passed through the notch, to support the lifting arm in a raised position and hold up the lid, said locking leaf having a second notch operating to permit the locking pin to pass out of engagement with the locking leaf when the lid is raised thereafter.

10. In a lid support, the combination of a fixed bracket adapted to be attached to a support, a lifting arm having a pivot connection with the bracket and adapted to be attached to the lid so that the said pivot connection operates as a hinge connection for the lid, said lifting arm having a tail-arm, a locking leaf carried on the tail-arm, a locking pin to cooperate with the same carried on the fixed bracket, said locking leaf having a notch operating to permit the locking pin to pass into the locking leaf in the opening movement of the lid, and also having a socket to engage the locking pin thereafter to hold the lid up, said locking leaf having a second notch to permit the locking pin to pass out of engagement with the locking leaf upon a further lifting movement of the lid.

11. In a lid support, the combination of a pair of toggle links with a pivot connection between the same, one of said links adapted to be attached to the lid, and the other to be pivotally attached to a support, one of said links having a tail-arm, a locking leaf pivoted thereto, and the other link having a locking pin thereon, a spring for holding said locking leaf yieldingly in position, said leaf having an extension in the path of the locking pin to be engaged by the locking pin, and having a notch in the edge thereof through which the pin will pass in the opening movement of the lid, said locking leaf having a stop to engage the locking pin after the same has passed through the said notch, to hold the lid in its raised position, said locking leaf having another extension with a second notch operating to release the locking pin from the locking leaf upon a further opening movement of the lid.

RALPH D. NEAL.